(12) United States Patent
You

(10) Patent No.: US 8,523,697 B2
(45) Date of Patent: Sep. 3, 2013

(54) METHOD AND APPARATUS FOR MEASURING THE SWING VELOCITY OF GOLF CLUB HEADS

(76) Inventor: Daniel You, Anaheim, CA (US)

( * ) Notice: Subject to any disclaimer, the term of this patent is extended or adjusted under 35 U.S.C. 154(b) by 128 days.

(21) Appl. No.: 13/287,738

(22) Filed: Nov. 2, 2011

(65) Prior Publication Data
US 2013/0109486 A1    May 2, 2013

(51) Int. Cl.
*A63B 53/08*    (2006.01)

(52) U.S. Cl.
USPC ............................................ 473/233

(58) Field of Classification Search
USPC ............................................ 473/233
See application file for complete search history.

(56) References Cited

U.S. PATENT DOCUMENTS

| | | | | |
|---|---|---|---|---|
| 4,967,596 | A * | 11/1990 | Rilling et al. | 73/492 |
| 6,705,952 | B1 * | 3/2004 | Vecsey | 473/232 |
| 7,001,283 | B2 * | 2/2006 | Jeong | 473/219 |
| 2004/0023726 | A1 * | 2/2004 | Ritson et al. | 473/220 |
| 2010/0190570 | A1 * | 7/2010 | Adams | 473/319 |

* cited by examiner

*Primary Examiner* — Michael Dennis
(74) *Attorney, Agent, or Firm* — Stetina Brunda Garred & Brucker; Lowell Anderson

(57) ABSTRACT

A tubular golf club shaft is formed with an area made of fiberglass through which you can see. A swing speed indicating device is fastened inside the shaft and visible through a fiberglass area so that you can read the speed indicated on the device. When the shaft is swung, an indicator moves inside the shaft to position an indicator along a scale on the shaft or the device so you can read various parameters derived from the velocity with which the club is swung. The shaft is formed by inserting a strip of translucent material such as fiberglass to overlap with adjacent strips of graphite material that form the shaft.

18 Claims, 2 Drawing Sheets

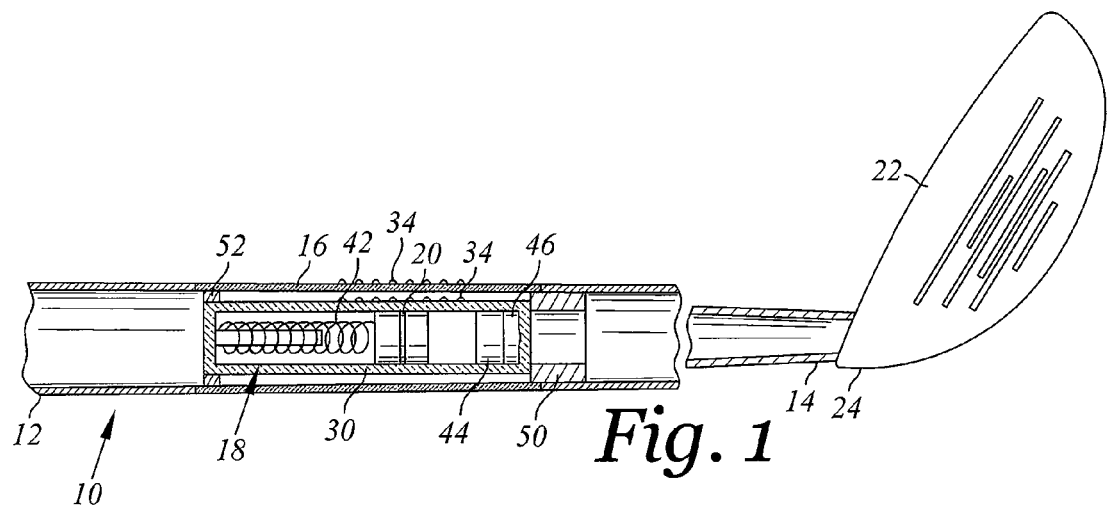
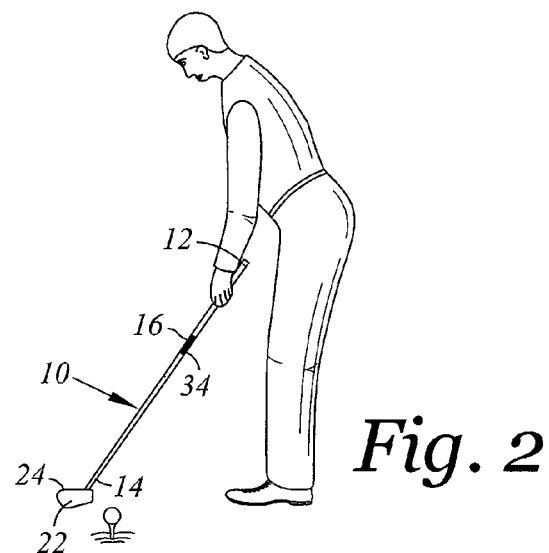
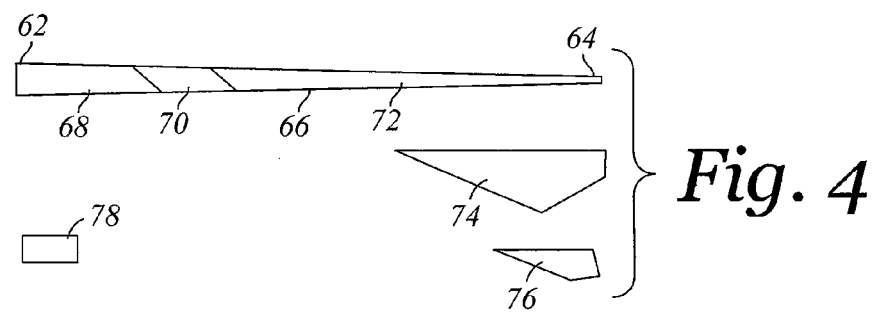

METHOD AND APPARATUS FOR MEASURING THE SWING VELOCITY OF GOLF CLUB HEADS

BACKGROUND

It is useful to know the velocity or speed of a golf club head since the velocity affects the distance a golf ball will travel when the golf club head strikes the golf ball. An important factor in developing skill in golf is the ability of the player to strike the ball with the club head at high speed, and to strike with a consistent speed. For example, the distance which a golf ball will travel after having been struck with a golf club is dependent in large part upon the club head velocity at the point of impact with the golf ball. Accordingly, it is advantageous for golfers to be able to generate maximum speed of the golf club face.

The path followed by the club face when swung by a player is essentially arcuate. The characteristic of an implement swung in an arcuate path which imparts kinetic energy to a struck object is the linear or tangential velocity component of the implement at the point of impact with the object. This tangential velocity component of the golf club will be referred to hereinafter as the "swing velocity". To train golfers to generate maximum swing velocity, it would be helpful to have some objective indicia of the swing velocity so that the effect of changes or refinements in swing technique on the swing velocity can be measured and readily seen by the golfer.

Remote sensors such as radar guns can be used to determine the velocity of the golf club head, but they are expensive and require persons other than the golfer to determine the velocity of the golf club head as it is swung. A velocity measurement device is known that fastens to the end of the shaft, above the golf club head, as described in U.S. Pat. No. 4,967,596 and as shown in FIGS. 1-2. But the attachable measurement device alters the weight and balance of the golf club and that affects the swing and the resulting club head velocity. The clip-on attachment also alters the appearance of the golf club in a way that is not pleasing. There is thus a need for an improved way to determine the velocity of a golf club head and a way that is preferably either pleasing to appearance or at least not unattractive and that does not require clipping something onto the outside of the club.

The interior of tubular golf club shafts can be viewed by looking through either end of the shaft—as long as the grip and head do not block the view. Thus far, there is believed to have been no need to view the interior of a golf club shaft through the wall of the shaft itself or transverse to the longitudinal axis of the shaft. Golf club shafts were originally been made of solid wood shafts, but are currently made of tubular shafts, using materials such as steel, titanium, fiberglass and graphite composite matrices to form tapered, tubular shafts. None of these shafts are believed to be sufficiently transparent or translucent to allow viewing of something inside the golf club shaft through the tubular wall of the shaft. Wood and metal are too opaque to see through. Prior fiberglass shafts are believed to have been colored and opaque, and graphite matrix shafts are black and opaque because of the carbon in the matrix.

While windows could be cut into tubular shafts to view the inside of the shaft, that is believed to never have been done, in part because the window would alter the structural integrity of the shaft and thus alter the shaft stiffness, bending, and other physical properties. A window would also make the stiffness non-symmetric and that has the effect of altering the shaft performance depending on how the golfer's grips on the shaft alters the orientation of the window relative to the golf ball being struck by the golf club head on the end of the shaft. These problems teach against viewing something through the wall of a golf club shaft.

BRIEF SUMMARY

A golf club shaft is formed, with the shaft being preferably tubular and made of graphite epoxy composite or other matrix sheet. The shaft is preferably tapered, but need not be tapered. The shaft is typically formed by wrapping strips or sheets of thin graphite epoxy matrix around a mandrel, curing the matrix and then removing the shaft from the mandrel. During the layup of the strips or sheets on the mandrel, a strip of clear or translucent fiberglass is inserted at the viewing location, with the fiberglass strip being joined to the graphite or other matrix strip used for the remainder of the shaft. The result is a shaft with a transparent or translucent window at the location of the fiberglass. A swing speed or swing velocity indicator is positioned inside the shaft at the location of the window. The velocity indicator is preferably of the type disclosed in U.S. Pat. No. 4,967,596. The window and swing velocity indicator are preferably located adjacent to, and preferably centered on, the swing point of the shaft. The swing point of the shaft is currently generally set at a distance of 14 inches from the butt end of the shaft. There is thus provided a golf club shaft with a window through which a swing velocity indicator can be viewed, with the window and velocity indicator preferably located at the swing point of the golf club.

In further detail, a golf club shaft has a longitudinal axis with a continuous wall encircling that axis and forming a tubular shaft. The shaft has a swing point located a predetermined distance from a grip end of the shaft, usually 14 inches. The wall has shaft's wall has a segment of translucent material that is sufficiently translucent to see through it, and located along a length of the longitudinal axis. In further variations, the shaft has a grip end and a club end, with the segment of material located toward the grip end of the shaft. Advantageously, the segment of translucent material is located to extend over a portion of the swing point of the shaft, and is preferably centered on the swing point of the shaft. The shaft may be made of graphite composite and the segment of translucent material may comprise fiberglass that is integrally joined with the graphite composite during formation of the shaft.

The shaft preferably includes a velocity indicator located inside the shaft, within at least a portion of the translucent material and viewable through that translucent material. The velocity indicator preferably has a length a portion of which is located at the swing point of the shaft. The velocity indicator is calibrated to indicate at least one of the velocity of a golf club head on the end of the shaft, the velocity of a ball struck by a golf club head on the end of the shaft, or the distance of projected travel of a ball struck by a golf club head on the end of the shaft.

The velocity indicator preferably comprises a tube enclosing a seismic mass slidably disposed in the tube and connected to a spring which resiliently urges the mass toward a first end of the tube. The tube also encloses a velocity indicator is positionable by the seismic mass. The velocity indicator is preferably centered at the swing point of the shaft. Preferably, the velocity indicator and swing point are both located about 14 inches from a grip end of the shaft. The shaft may be provided alone, with the indicator, with a club head, or any combination thereof.

There is also provided a golf club shaft having a longitudinal and a tubular shaft with a wall encircling the longitudinal axis. The shaft forms tapered shaft having a swing point located about 14 inches from a grip end of the shaft. The wall has a segment of translucent material that is sufficiently translucent to see with a portion of the translucent section located at the swing point. A measurement device is optionally located inside the shaft and an indicator a measurement device located inside the shaft and having an indicator the position of which changes depending on the velocity with which the shaft is swung. At least a portion of the indicator is viewable through the translucent section.

In further variations, the measuring device comprises a tube enclosing a seismic mass slidably disposed in the tube and connected to a spring resiliently urging the mass toward a first end of the tube with the indicator positionable by the seismic mass. The tube also preferably has a reset mass to reset the indicator. The indicator can be calibrated to indicate at least one of the velocity of a golf club head on the end of the shaft, the velocity of a ball struck by a golf club head on the end of the shaft, or the distance of projected travel of a ball struck by a golf club head on the end of the shaft. The tube is removable from the shaft along the longitudinal axis. The shaft can have a head or be sold without the head. A scale is preferably placed on the outside of the shaft and cooperates with the indicator to indicate at least one of the velocity of a golf club head on the end of the shaft, the velocity of a ball struck by a golf club head on the end of the shaft, or the distance of projected travel of a ball struck by a golf club head on the end of the shaft.

There is also provided a process for making a tubular golf club shaft. The process includes placing first, second and third strips of material around a mandrel having a longitudinal axis with the second strip being between the first and third strips. Each of the strips has edges that overlap the adjacent strip. The first and third strips comprising graphite epoxy material and the second strip comprises a translucent material. The second strip overlaps with a portion of each of the first and third strips. The second strip has a length measured along the longitudinal axis that is shorter than the first and third strips. The process further includes curing the strips of material to join the overlapping edges into a unitary shaft. The process also includes removing the shaft from the mandrel.

In further variations, the shaft and mandrel are tapered from a larger diameter grip end toward a smaller diameter club head end. The method may also include the step of locating the second strip to overlap with a location of the swing point of the completed shaft. The second strip of material is preferably fiberglass, but could be is formed of epoxy.

The process preferably includes inserting a measurement device into the shaft and positioning the device so that at least an indicator portion of the device is viewable through the translucent portion. The measurement device is configured to change the location of the indicator depending on the velocity with which the shaft is swung. At least a portion of the measurement device and the indicator are viewable through the translucent section.

The process advantageously positions the measurement device at about 14 inches from the grip end of the shaft. The process may further include fastening a golf club head on a head end of the shaft. Advantageously, the inside of the shaft is buffed to reduce surface roughness, which increases visibility through the translucent section. Moreover, the inside and outside of the shaft are advantageously clear coated with a lacquer, polyurethane or other liquid that hardens to form a clear protective coat, in order to further smooth the surface and improve visibility through the translucent section.

BRIEF DESCRIPTION OF THE DRAWINGS

These and other advantages of the invention will be better understood by reference to the following description and figures, in which like numbers refer to like parts throughout, and in which:

FIG. 1 is a sectional view of a golf club shaft and club club with a swing indicator therein;

FIG. 2 is an illustration of the golf club of FIG. 1 in use;

FIG. 4 is a plan view of an illustrative layup for the shaft of FIG. 1.

DETAILED DESCRIPTION

Figure 3A:
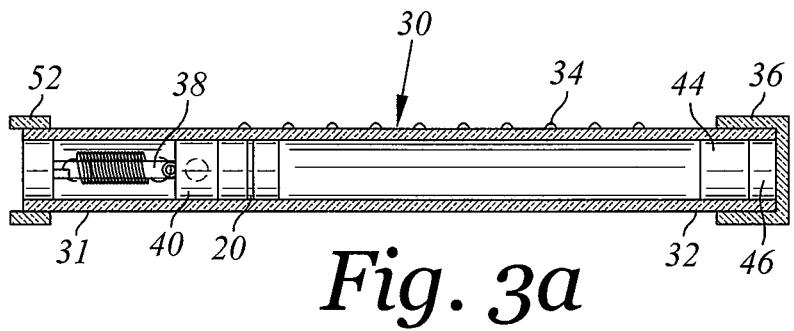
FIGS. 3a-3d are sectional views of the swing indicator device of in FIG. 1.

Referring to FIGS. 1-2, a golf club shaft 10 has a grip end 12 and an opposing club head end 14. A translucent section 16 is located between ends 12, 14 with a measurement device 18 and its indicator 20 being viewable through the translucent section 16. The translucent section 16 thus forms a window through which at least the indicator 20 is visible. Preferably the measurement device 18 determines swing velocity at the location of the club face 22 of a club head 24 fastened to the end 14, with the indicator displaying the output of the measurement device 18.

The translucent section 16 is preferably completely transparent, and less preferably is at least sufficiently clear to view the indicator through the section 16. Thus, as used herein "translucent" includes transparent as well as including materials that block or diffuse a portion of the light passing through the material, but allow sufficient visibility to see the indicator 20, and preferably to also see a portion or all of measurement device 18.

The measurement device 18 is preferably a swing velocity indicator as described in U.S. Pat. No. 4,967,596, the complete contents of which are incorporated herein by reference. That measurement device 18 is briefly described with respect to FIGS. 3a-3d. The measurement device 18 thus preferably comprises a hollow tube 30 having a proximal end 31 and a distal end 32. The tube 30 is advantageously comprised of a translucent material such as Plexiglas to permit viewing through the walls of the tube. A scale 34 is placed on the exterior surface of the tube 30, or alternatively the scale 34 may be placed on the exterior surface of the shaft 10, preferably on the translucent section 16 to display the results of the measurement device 18. A decal is suitable for forming scale 34.

The proximal end 31 of the tube 30 is terminated by an end cap 36. The interior end of the end cap 36 located toward the grip end 12 (FIG. 1) and proximal end 31 has an elongated stop pillar 38 attached thereto. A seismic mass 40 is slidably disposed within the tube 30. The seismic mass 40 is generally cylindrical with opposing first and second ends. The seismic mass 40 is resiliently attached to the end cap 36 by means of a resilient member such as coil spring 42. A first end of the spring 42 is fastened to the stop pillar 38 on the distal end of the end cap 36. The opposing second end of the spring 42 is rotatably connected to a first end of the seismic mass 40. The seismic mass 40 has an outer diameter slightly smaller than the inner diameter of the tube 30 to allow air to pass between the seismic mass and the interior wall 24 of the tube.

The tension of the spring 42 draws the seismic mass 40 snugly against the distal end of the elongated stop pillar 38. The stop pillar 38 thus serves as a spacer element to maintain the spring 42 in a constant state of tension when the seismic mass 40 is at rest. That keeps the seismic mass 40 from rattling around when not in use. Disposed within the tube 30 on the side of the seismic mass 40 opposite the spring 42 is the indicator 20. The indicator 20 of the preferred embodiment comprises a central narrow plastic disk sandwiched between a pair of cylindrical elements formed from a lightweight, semi-rigid material such as foam plastic so as to have minimal mass. The indicator has a first end facing the proximal end of the tube 30 and a second end facing the distal end 32 of the tube. The indicator 20 is dimensioned to engage the interior wall of the tube 30 snugly, but not so tightly as to prevent movement of the indicator 20 along the tube 30. The frictional fit between the circumference of the indicator 20 and the inner wall 24 of the tube 30 permits the indicator 20 to be displaced longitudinally within the tube 30 by an applied force but allows the indicator 20 to maintain its position with respect to the tube once the applied force is removed.

Slidably disposed within the tube 30 on the side of the indicator 20 opposite the seismic mass 40 is a reset mass 44, preferably of iron or other suitable metallic material. The reset mass 44 is generally cylindrical and has an outer diameter slightly smaller than the inner diameter of the tube 30 so as to slide freely therewithin. The reset mass 44 is normally held at the distal end 32 of the tube 30 by a magnet 46 terminating the distal end of the tube.

Referring now to FIGS. 3a-3d, the operation of the measurement device 18 will be explained. In its "ready" configuration, depicted in FIG. 3a, the seismic mass 40 is pulled against the distal end 66 of the stop pillar 38 by the tension of the spring 42. The indicator 20 rests against the second end of the seismic mass 40. At the distal end 32 of the tube 30, the reset mass 44 is held in place by the magnet 46.

Figure 3B:
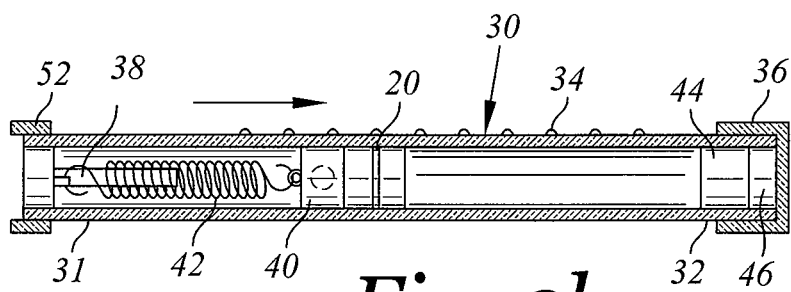
Figure 3C:
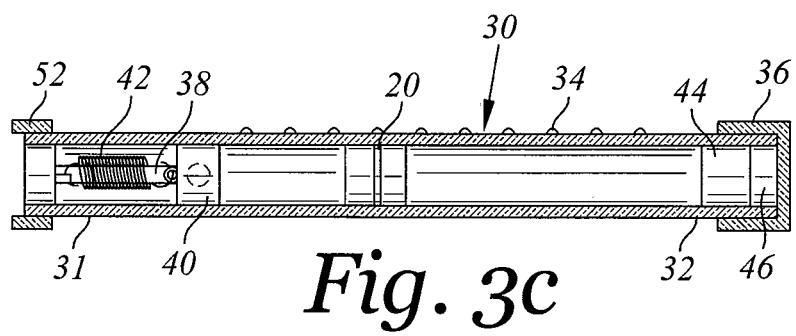

FIG. 3b depicts the operation of the measurement device 18 during swinging of the shaft 10. As the shaft 10 is swung, centrifugal force urges the seismic mass 40 up the bore of the tube 30 against the tension of the spring 42 in the direction indicated by the arrow in FIG. 3b. As the seismic mass 40 is displaced up the tube 30, it pushes the indicator 20 ahead of it. As the swing is completed, the spring 42 pulls the seismic mass 40 back to its rest position against the stop pillar 38, as depicted in FIG. 3c. The sliding interference fit between the indicator 20 and the inner wall of the tube 30 is sufficient to retain the indicator 20 at its uppermost location of displacement. The location of the indicator 20 can be compared to the scale 34 to provide an indication of the swing velocity or other things, depending on the calibration of the scale 34.

Figure 3D:
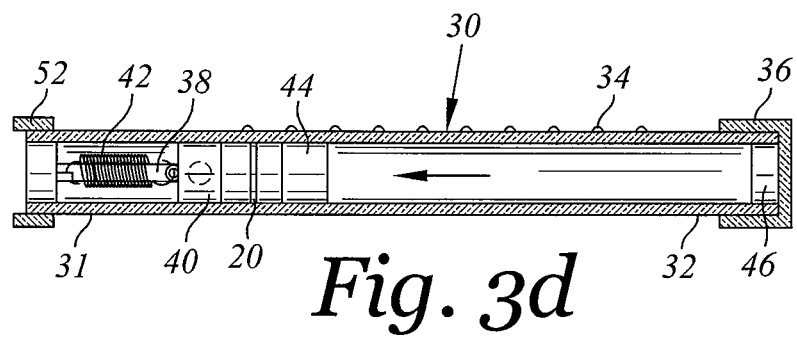

Referring to FIG. 3d, once the indicator 20 has been read off the scale 34, the indicator 10 is reset by tapping the club end 14 of the shaft 10 against the ground or the user's hand with sufficient force to jar the reset mass 44 loose from the pull of the magnet 46 at the end of the tube 30. The reset mass 44 slides down the tube 30 in the direction indicated by the arrow in FIG. 3d, pushing the indicator 20 ahead of it, until the indicator rests against the second end of the seismic mass 40. The fit between the reset mass 44 and the inner wall of the tube 30 permits air to pass therebetween to allow the reset mass to slide freely within the tube 30 without resistance from pneumatic damping. Alternatively, the mass 44 can have one or more openings therein to reduce the effects of air. The shaft 10 is then inverted from its grip-down orientation, causing the reset mass 44 to slide back down the tube 30 toward the magnet 46 with the magnet holding the reset mass 44 in place until it is again jarred loose. The interference fit between the circumference of the indicator 20 and the inner walls of the tube 30 maintains the indicator against the seismic mass 40. After resetting, the measurement device 18 once again assumes the configuration depicted in FIG. 3a and is ready for reuse.

Thus, referring to FIGS. 1 and 3, the centrifugal force affected by swinging the shaft 10 will displace the seismic mass 40 down the tube 30 against the tension of the spring 42, pushing the indicator 20 ahead of it. As the swing is completed, the seismic mass 40 is drawn back to its initial position against the proximal end of the stop sleeve 64 by the tension of the spring 42, but the indicator 20 remains lodged in the bore of the tube 30 at its forwardmost point of displacement. The position of the indicator 20 is read against the scale 34 to provide the readout obtained by the measurement device 18. The butt end 12 of the shaft 10 is then tapped against the ground to dislodge the reset mass 44 from the pull of the magnet 46, and the reset mass slides down the tube 30 to impel the indicator 20 back to its initial position imposed against the seismic mass 40. The shaft 10 is then inverted to its club head-down orientation to permit the reset mass 44 to slide back down to the distal end 32 of the tube 30, there to be captured again by the magnet 46.

The weight of the seismic mass 40 and the spring constant of the spring 42 are selected to control the range of outward displacement of the seismic mass during the swing. The maximum force to which the spring-mass will be subjected is directly dependent upon the maximum centrifugal force which will be exerted during swinging of the implement. The account the frictional force exerted by the indicator against the walls of the tube 30 may be taken into account by adjusting the scale 34 against which the indicator 20 displacement is read. The characteristic, or natural, frequency of the spring-mass system should be much greater than the characteristic frequency of the swing in order to ensure that the seismic mass will move to the proper axial position in a time interval much shorter than the duration of the swing. Also, damping must be introduced to prevent the outward displacement of the seismic mass 44 from overshooting the correct value. In the closed tube 30, if the circumference of the seismic mass 44 fit the walls of the tube 30 snugly, the air ahead of the moving seismic mass 40 would be compressed and would greatly damp the motion of the seismic mass. Conversely, if compression of air within the tube as the seismic mass moves were completely eliminated, i.e. the mass is undamped, the outward displacement of the seismic mass 40 would overshoot the correct value. Ideal damping, or "critical damping," is provided when the sprung seismic mass 40 moves as fast as possible without overshooting the correct value. The air flow between the sides of the seismic mass 40 and the wall of the tube 30 is adjusted to provide critical damping, thereby preventing the seismic mass from overshooting its correct value without preventing it from reaching its correct value. Various arrangements of air passages may be employed to provide the desired degree of damping, such as by providing a central longitudinal bore through the seismic mass.

The scale 34 may express an objective indication of swing velocity in several different ways. First, the scale 34 may be calibrated to express displacement of the indicator 20 in terms of a club head velocity expressed in, for example, miles per hour, kilometers per hour, feet per second, or meters per second. Second, the scale 34 may be calibrated to express displacement of the indicator in terms of the distance which a golf ball would travel when struck by a club head 24 travelling at the corresponding swing velocity. But factors other than club head velocity affect the distance traveled, including the loft of the club head 24. Since the measurement device 18 is placed inside a single shaft 10, the device 18 can be calibrated to account for the shaft length, loft, arm length and height of the golfer. Third, the scale 34 could simply be calibrated on a "one to ten" scale, or bad to good to great scale, or other qualitative indicator to provide a relative basis for comparison to other swings.

For golf clubs, the axis of rotation of the club head 24 includes not only the length of the shaft 10 but also the length of the player's arms. Since this length will vary from player to player, the scale 34 may not be totally accurate for players with arms which are shorter or longer than average. Further, it is well known that golf clubs vary in length, with higher lofted irons having shorter shafts and lower lofted clubs having longer shafts so that both the club length and loft affect the ball distance. Moreover, the location of the measuring device 10 is offset from the club face 22, and that offset must be accommodated. These potential variations in club shaft length, loft angle of the club face 22, length of the golfer's arms and the location of the measuring device 18 relative to the pivot point and the golf club face 22 introduce potential variables that may result in some inaccuracy if not properly accounted for. In the preferred embodiment these variables are accounted for by adjusting the scale 34 or adjusting the measurement device 18 for each shaft 10, preferably before the device 18 is fastened to the shaft 10. Thus, each measurement device 18 could be separately calibrated to account for one or more of these variables before inserting the device 18 into the shaft 10, or the scale 34 could be adjusted to accommodate for one or more of these variables before being placed on the shaft 10 or tube 30.

The measurement device 18 is preferably inserted through the open grip end 12 of the shaft. The device 18 is preferably positioned so that it is centered on the swing point of the shaft, which is typically 14 inches from the end of the shaft at the grip end 12. That also places the measurement device 18 on the longitudinal axis of the shaft 10 so the longitudinal axis of tube 30 generally coincides with the longitudinal axis. That also minimizes the effect of the device 18 on the use of the shaft 10. The device 18 can be positioned elsewhere than at the swing point, but if it is located at the swing point the effect on the mass distribution of the shaft 10 and resulting golf club are minimized.

To position the device 18 inside the shaft 10, the shaft can be formed with an internal position stop 50, such as an internal ridge, boss or ridge or other inward protuberance that abuts the end of the distal end of tube 30 to position the measurement device 18 along the longitudinal axis of the shaft. The internal ridge or flange 50 is readily formed by placing a mating shape on the mandrel used to form the shaft 10. Alternatively, the outer diameter of the tube 30 or an end of the tube 30 can be sized relative to the internal tapered diameter of the tubular shaft 10 to cause an interference fit that wedges the measuring device 18 in the desired position.

Adhesives applied to the tube 30, especially the distal end abutting the shaft 10 or stop 50, can be used to permanently fasten the measuring device in the shaft 10. If the desired position does not cause the tube 30 to abut the interior wall of tubular shaft 10, then positioning devices 52 such as annular spacers or disk spacers can be fastened to one or both ends of the tube 30, with the diameter or shape of the devices 52 sized to either abut the inside of the shaft 10, or be close enough to the inside walls of the shaft 10 to be adhesively fastened in place. Alternatively, snap rings, rings, spacers, or other fastening devices can be placed inside the shaft 10 after the measuring device is inserted and either be removably fastened to the inner wall of the shaft (e.g., threads, bayonet lock, snap lock) or fastened by adhesives to keep the measuring device 18 from moving toward the grip end 12 during use. Numerous other ways of either removably or permanently fastening the measuring device inside the shaft 10 will be apparent to one skilled in the art given the present disclosure.

In some instances it is desirable that the tube 30 by itself not block air flow through the inside of the shaft 10 before the tube is fastened to the shaft. Thus if needed the inside of the shaft 10 can be shaped different from the mating segment of the tube 30, or the tube 30 can be shaped different than the mating shape of the inside of shaft 10. For example, the inside of the shaft 10 can have a plurality of flats as described in U.S. Pat. No. 7,862,447 to form an air passage relative to a cylindrical tube 30, or the tube 30 can have a flat portion or tunnel portion forming an air passage between the outer periphery of tube 30 and the abutting walls of a circular inside of tubular shaft 10 when the tube 30 is inserted into position in the shaft.

The translucent section 16 can be located at any desired location along the length of shaft 10. Advantageously the translucent section 16 is located on the shaft 16 at a location where the indicator 20 appears so the indicator position can be seen through the wall forming the shaft 10. The scale 34 can be inside or outside the walls forming the shaft 10, but should be close enough that the position of indicator 20 is seen relative to the scale.

The transparent section 16 is advantageously formed of clear fiberglass bonded during formation of the shaft 10 to adjacent sections of the material from which the shaft 10 is formed, with the adjacent sections preferably being formed of graphite epoxy composite. But it is believed suitable to have section 16 formed using only epoxy or using scrim cloth and epoxy, although in such instances the length of the section 16 is preferably kept as short as practical since the epoxy alone or the epoxy and scrim is not believed to be as strong as either a translucent fiberglass section or as strong as graphite composite of the same thickness.

Referring to FIG. 4, the manufacture of the shaft 10 and translucent section 16 will be described. When laid out flat a typical composite layup has parallel ends comprising a wider base 60 and narrower top 62, with two sides 64, 66 tapering from the base to the top to form a symmetric, four sided quadrilateral. This assumes the shaft 10 is tapered being larger at the grip end 12 and smaller in diameter at the club head end 14. The flat layup looks like a section of a truncated cone. The normal layup is altered and instead of being formed of a single sheet of composite material is instead formed by three layup sections of selected composite sheets. The three sections include a first, grip layup section 68, a second translucent layup section 70, and a third club end layup section 72. The first and third sections 68, 72 are preferably made of graphite composites and correspond to the grip end 12 and club head end 14 of the formed shaft 10.

The second section 70 is preferably made of clear fiberglass. The fiberglass section 70 may be woven or open weave. Alternatively, a second section 70 made of clear epoxy, scrim and clear epoxy, or other translucent materials are believed suitable. It is believed suitable to also use an open metal mesh such as aluminum or titanium or steel. The second section 70 is located so that it corresponds to the desired location of translucent section 16 on the completed shaft 10 sold for commercial use. Preferably, the finished shaft 10 will have the center of the second section about 14 inches from the end of the completed shaft but because the shafts are trimmed, the actual location along the length on the layup may be longer than 14 inches. In appropriate cases the manufacturer or gold shop may trim the grip end 12 up to about 10 inches shorter than the manufactured length, or trim the head end 14 up to five inches shorter than the manufactured length. The precise amount of length adjustment will vary. The material forming the second section 70 is located between and preferably overlaps the adjacent first and third sections 68, 72. An overlap of about 70 mm is believed suitable, but will vary with the particular design and materials used. A second section 70 having a length of about 240-460 mm measured along the longitudinal axis is believed suitable. But the length can vary, as can the location. When placed around a tapered mandrel the first and third sections 68, 72 overlap with the second section 70.

Since the shaft tapers toward the smaller diameter club head end 14, the shaft is weaker and that typically requires adding more layers of material to strengthen the formed shaft 10. Thus, a fourth layer of composite material 74 is wrapped around the outside of the third section 72, and a fifth layer of composite material 76 is wrapped around the outside of the fourth section. A sixth layer of composite material 78 may be wrapped around the outside of the first section 68, at the grip end to strengthen the hollow end. The sixth section 76 advantageously does not overlap with the second section 70. Epoxy is applied to these various layers and sections, with the epoxy applied to the second section 70 preferably being selected to dry sufficiently clear to provide translucent section 16. Numerous clear drying epoxies are known and believed suitable.

The mandrel and shaft are then placed in an oven or autoclave to heat and compress the materials against the mandrel. After the heat and pressure has cured the materials, the mandrel is removed leaving a tapered, tubular shaft. The inside of the shaft is covered with a clear coat. At this point in the manufacturing sequence, the translucent section 16 is preferably clear enough that a golfer can see through it and read the position of indicator 20 located inside the shaft. But preferably the inside of the shaft, or at least the inside of the translucent section 16 is buffed. A rotary fabric buffer dressed with 1000 grit or finer abrasive is believed suitable. This buffing reduces the surface roughness and improves visibility through the translucent section 16. Preferably, but optionally, the inside of the shaft 10, or at least the inside of the translucent section 16 is clear coated with a thin coating of glossy lacquer or polyurethane or other sealant. A clear coat thickness of about 0.001 inches or less is believed suitable. The clear coat is glossy to improve visibility. Additional glossy clear coats may be used as desired. This clear coat further smoothes out the roughness of the translucent section 16 and improves visibility through the section 16. As desired, the outside of the shaft 10 and translucent section may be coated with one or more clear coats.

The above disclosure describes a shaft preferably made of graphite epoxy composites. The particular number of plies in the shaft 10, the orientation of the graphite fibers, graphite layers or fiberglass layers, and the particular epoxy used will vary depending on the manufacturer and the desired properties of the shaft 10.

What is claimed is:

1. A golf club shaft having a longitudinal axis, comprising a continuous wall encircling the longitudinal axis and forming a tubular shaft having a swing point located a predetermined distance from a grip end of the shaft, the wall having a segment of translucent material that is sufficiently translucent to see through located along a length of the longitudinal axis; further comprising a swing velocity indicator located within at least a portion of the translucent material and viewable through that translucent material; wherein the velocity indicator is calibrated to indicate at least one of the velocity of a golf club head on the end of the shaft, the velocity of a ball struck by a golf club head on the end of the shaft, or the distance of projected travel of a ball struck by a golf club head on the end of the shaft.

2. The golf club shaft of claim 1, wherein the shaft has a grip end and a club end, with the segment of material located toward the grip end of the shaft.

3. The golf club shaft of claim 1, wherein the segment of translucent material is located to extend over a portion of the swing point of the shaft.

4. The golf club shaft of claim 1, wherein the segment of translucent material is centered on the swing point of the shaft.

5. The golf club shaft of claim 1, wherein the shaft is made of graphite composite and the segment of translucent material is fiberglass that is integrally joined with the graphite composite during formation of the shaft.

6. The golf club shaft of claim 1, wherein the velocity indicator has a length a portion of which is located at the swing point of the shaft.

7. A golf club shaft having a longitudinal axis, comprising a continuous wall encircling the longitudinal axis and forming a tubular shaft having a swing point located a predetermined distance from a grip end of the shaft, the wall having a segment of translucent material that is sufficiently translucent to see through located along a length of the longitudinal axis; further comprising a swing velocity indicator located within at least a portion of the translucent material and viewable through that translucent material; wherein the velocity indicator comprises a tube enclosing a seismic mass slidably disposed in the tube and connected to a spring resiliently urging the mass toward a first end of the tube and a velocity indicator positionable by the seismic mass.

8. The golf club shaft of claim 7, wherein the velocity indicator is located at the swing point of the shaft.

9. The golf club shaft of claim 7, wherein the velocity indicator and swing point are both located about 14 inches from a grip end of the shaft.

10. The golf club shaft of claim 1, further comprising a golf club head on a head end of the shaft.

11. The golf club shaft of claim 1, further comprising a golf club head on a head end of the shaft.

12. A golf club shaft having a longitudinal axis, comprising a tubular shaft having a wall encircling the longitudinal axis and forming a tapered shaft having a swing point located about 14 inches from a grip end of the shaft, the wall having a segment of translucent material that is sufficiently translucent to see through with a portion of the translucent section located at the swing point; and a measurement device located inside the shaft and having an indicator the position of which changes depending on the velocity with which the shaft is swung, with at least a portion of the indicator being viewable through the translucent section.

13. The golf club shaft of claim 12, wherein the measurement device comprises a tube enclosing a seismic mass slidably disposed in the tube and connected to a spring resiliently urging the mass toward a first end of the tube with the indicator positionable by the seismic mass.

14. The golf club shaft of claim 13, further comprising a reset mass on the measuring device to reset the indicator.

15. The golf club shaft of claim 12, wherein the indicator is calibrated to indicate at least one of the velocity of a golf club head on the end of the shaft, the velocity of a ball struck by a golf club head on the end of the shaft, or the distance of projected travel of a ball struck by a golf club head on the end of the shaft.

16. The golf club shaft of claim 13, further comprising a golf club head on the end of the shaft.

17. The golf club shaft of claim 12, wherein the tube is removable from the shaft along the longitudinal axis.

18. The golf club shaft of claim 12, further comprising a scale on the outside of the shaft cooperating with the indicator to indicate at least one of the velocity of a golf club head on the end of the shaft, the velocity of a ball struck by a golf club head on the end of the shaft, or the distance of projected travel of a ball struck by a golf club head on the end of the shaft.

* * * * *